(12) United States Patent
Magnusson et al.

(10) Patent No.: US 10,375,184 B2
(45) Date of Patent: Aug. 6, 2019

(54) ELECTRONIC CONTENT ENGAGEMENT DETERMINATION

(71) Applicant: salesforce.com, inc., San Francisco, CA (US)

(72) Inventors: Johan Philip Magnusson, Stockholm (SE); Joel Ragnar Palmert, Stockholm (SE)

(73) Assignee: salesforce.com, inc., San Francisco, CA (US)

( * ) Notice: Subject to any disclaimer, the term of this patent is extended or adjusted under 35 U.S.C. 154(b) by 298 days.

(21) Appl. No.: 14/749,982

(22) Filed: Jun. 25, 2015

(65) Prior Publication Data

US 2016/0381157 A1 Dec. 29, 2016

(51) Int. Cl.
G06F 15/16 (2006.01)
H04L 29/08 (2006.01)

(52) U.S. Cl.
CPC .............. H04L 67/22 (2013.01); H04L 67/02 (2013.01)

(58) Field of Classification Search
CPC ........................................................ H04L 67/02
USPC ............ 709/203, 219, 204; 705/14.41, 7.32, 705/14.45, 14.73; 715/738, 277, 234, 715/782, 764
See application file for complete search history.

(56) References Cited

U.S. PATENT DOCUMENTS

| | | | |
|---|---|---|---|
| 7,647,309 B1* | 1/2010 | Bar | 707/3 |
| 2002/0111865 A1* | 8/2002 | Middleton, III | G06Q 30/02 705/14.41 |
| 2010/0004977 A1* | 1/2010 | Marci | G06Q 10/10 705/7.32 |
| 2010/0198653 A1* | 8/2010 | Bromenshenkel | G06Q 10/063 705/7.11 |
| 2011/0029464 A1* | 2/2011 | Zhang | G06N 5/045 706/12 |
| 2011/0166926 A1* | 7/2011 | Lv | G06Q 10/04 705/14.45 |
| 2013/0110649 A1* | 5/2013 | Sugiura | G06Q 30/0224 705/14.73 |
| 2014/0123024 A1* | 5/2014 | Bau | H04L 51/04 715/752 |
| 2015/0112898 A1* | 4/2015 | Shah | G06N 99/005 706/12 |
| 2015/0278157 A1* | 10/2015 | Srivastava | H04L 67/22 703/2 |
| 2016/0098178 A1* | 4/2016 | Reavis | G06Q 30/02 715/764 |
| 2016/0315899 A1* | 10/2016 | Brunn | H04L 51/26 |

* cited by examiner

*Primary Examiner* — Thuong Nguyen
(74) *Attorney, Agent, or Firm* — Meyertons, Hood, Kivlin, Kowert & Goetzel, P.C.

(57) ABSTRACT

This disclosure provides various techniques that may allow for tracking how a user interacts with content. For example, a user may interact with various types of content, such as web pages, applications, text, multimedia, or any other type of content. In one example of web page content, for example, this disclosure provides that executable code may be included with a web page and run on a user's system (e.g., via a web browser). The code may be capable of monitoring which content is visible in a viewport of the web browser, when the content is visible, and what part of the viewport contains the content. This monitoring data may be used to measure user interaction or engagement with the content.

12 Claims, 6 Drawing Sheets

ELECTRONIC CONTENT ENGAGEMENT DETERMINATION

BACKGROUND

Technical Field

This disclosure relates to the monitoring of user interactions with electronic content, and more particularly to determining a user's level of engagement with various elements of electronic content.

Description of the Related Art

Currently, when a provider of electronic content (e.g., web page content) sends content to a user, it may be difficult or impossible for the provider to determine the user's engagement with—that is, whether or not the user has read or otherwise interacted with—that content. For example, when a web page is sent to a user, the user is typically free to navigate, scroll, view and read (or not read) as desired, and there is currently no satisfactory way of determining or estimating which portions of the content the user has actually engaged with. This disclosure is directed to remedying this deficiency in the art.

BRIEF DESCRIPTION OF THE DRAWINGS

FIG. 2 shows an example of a viewport according to a web browser embodiment.

FIG. 3 shows the example of FIG. 2, with the addition of data indicative of locations on which a user is likely to focus.

DETAILED DESCRIPTION

Currently, when a provider of electronic content (i.e., content that can be transmitted over a computer network and displayed by a computer system) sends content to a user, it is difficult or impossible for the provider to determine to what extent the user has engaged with (e.g., read, viewed, interacted with, etc.) the content. According to this disclosure, techniques are provided to determine or estimate a level of user engagement with electronic content. In some embodiments, these techniques may have enough granularity to determine or estimate the level of user engagement with subsections or individual elements of the provided electronic content.

It should be noted that various elements of this disclosure that are shown in the figures or described in the text may be used in conjunction with any of the computer systems, servers, mobile devices, other apparatuses, elements, or components disclosed herein or known in the art, among other systems. In various embodiments, some of the elements of process flows shown may be performed concurrently instead of sequentially, or in a different order than shown, or may even be omitted altogether in some cases. Additional process flow elements that are not shown may also be performed as appropriate or desired. In some embodiments, different elements of process flows may be performed by the same system or different systems.

One of ordinary skill in the art with the benefit of this disclosure will understand that various types of database or other storage technologies may be used in accordance with this disclosure. One of ordinary skill in the art with the benefit of this disclosure will also understand that the teachings herein are applicable to various types of situations in which tracking user engagement with content is a goal, and need not be limited to any specific situation described herein.

Figure 1:
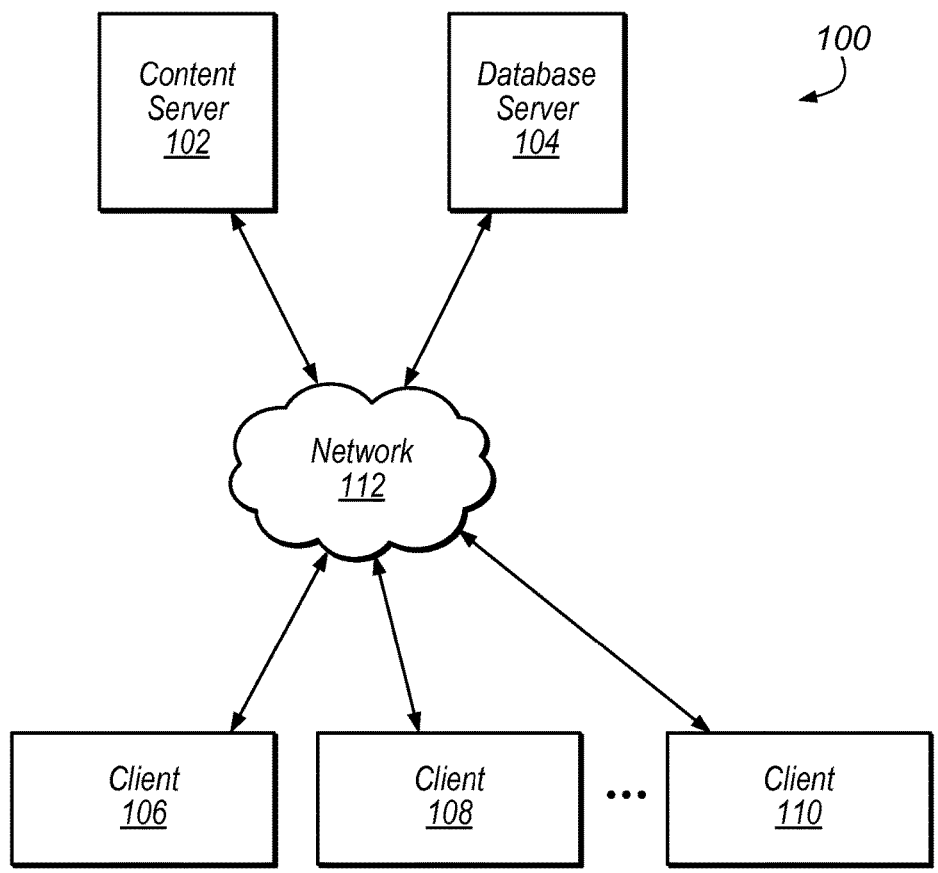
FIG. 1 is a block diagram illustrating an embodiment of this disclosure.

Turning now to FIG. 1, a block diagram of system 100 is shown. In system 100, content server 102 is operable to provide content to clients 106, 108, and 110 via network 112. Clients 106, 108, and 110 may be mobile devices, personal computers, or any other apparatuses or systems configured to receive electronic content from content server 102.

Content server 102 may include one or more physical machines. Network 112 may represent the Internet, an intranet, or any other suitable type of computer network. In some embodiments, content server 102 may be a web server. In other embodiments, however, other types of electronic content servers are also contemplated. For example, content server 102 may provide application-specific content to an application (e.g., a smartphone application or a computer application). In other embodiments, still other types of content may be provided, as appropriate. In general, content server 102 typically provides textual content, graphical content, audio content, video content, executable code content, and/or binary content, etc. to one or more of clients 106, 108, and 110. Throughout this disclosure, for the sake of concreteness and simplicity, the use of a web server to provide web-based electronic content is discussed. One of ordinary skill in the art with the benefit of this disclosure, however, will understand that this disclosure contemplates and is intended to apply to various other types of electronic content as well.

FIG. 1 also includes database server 104. In some embodiments, database server 104 may be embodied in the same physical system(s) as content server 102, or database server 104 may be embodied in a different system or systems. Various types of data may be stored on database server 104, as discussed in more detail below. In some cases, clients 106, 108, and 110 may communicate directly with database server 104; in other cases, clients 106, 108, and 110 may communicate only with content server 102, and content server 102 may in turn communicate with database server 104. The communication between content server 102 and database server 104 may be via the same network 112 as shown in FIG. 1, or via a different (e.g., an internal) network.

Regardless of the exact arrangement of content server 102, database server 104, and clients 106, 108, and 110, it may sometimes be desirable for a content provider to be able to determine a level of engagement of the users of clients 106, 108, and 110 with the various items of content served by content server 102. Currently, such monitoring has been difficult to achieve from the server side, because once content is served to clients 106, 108, and 110, the users of such clients may be free to do whatever they like with that content and need not provide any reporting data on the usage of the content. For example, when a user at a client computing system downloads a web page from content server 102, he or she is then free to scroll the web page, read various portions of the web page, interact with various portions of the web page, and generally engage with various portions of the web page as desired. All of this may occur without any additional communication with content server 102 (unless, for example, additional content is requested from content server 102 by such engagement).

The existing situation in which no reporting on content engagement is available may create problems for the owner of content server 102 (or in general, for the content provider). That is, up until now, there have not been sufficient ways of determining whether the user has engaged with the content, and more specifically which portion(s) of the content the user has engaged with. In general, within this disclosure, the terms "server computing system" and "client computing system" may each be understood to refer to any system including one or more computers or other computing devices. For example, one embodiment of such a constituent computing device is described below with reference to FIG. 6.

Figure 2:
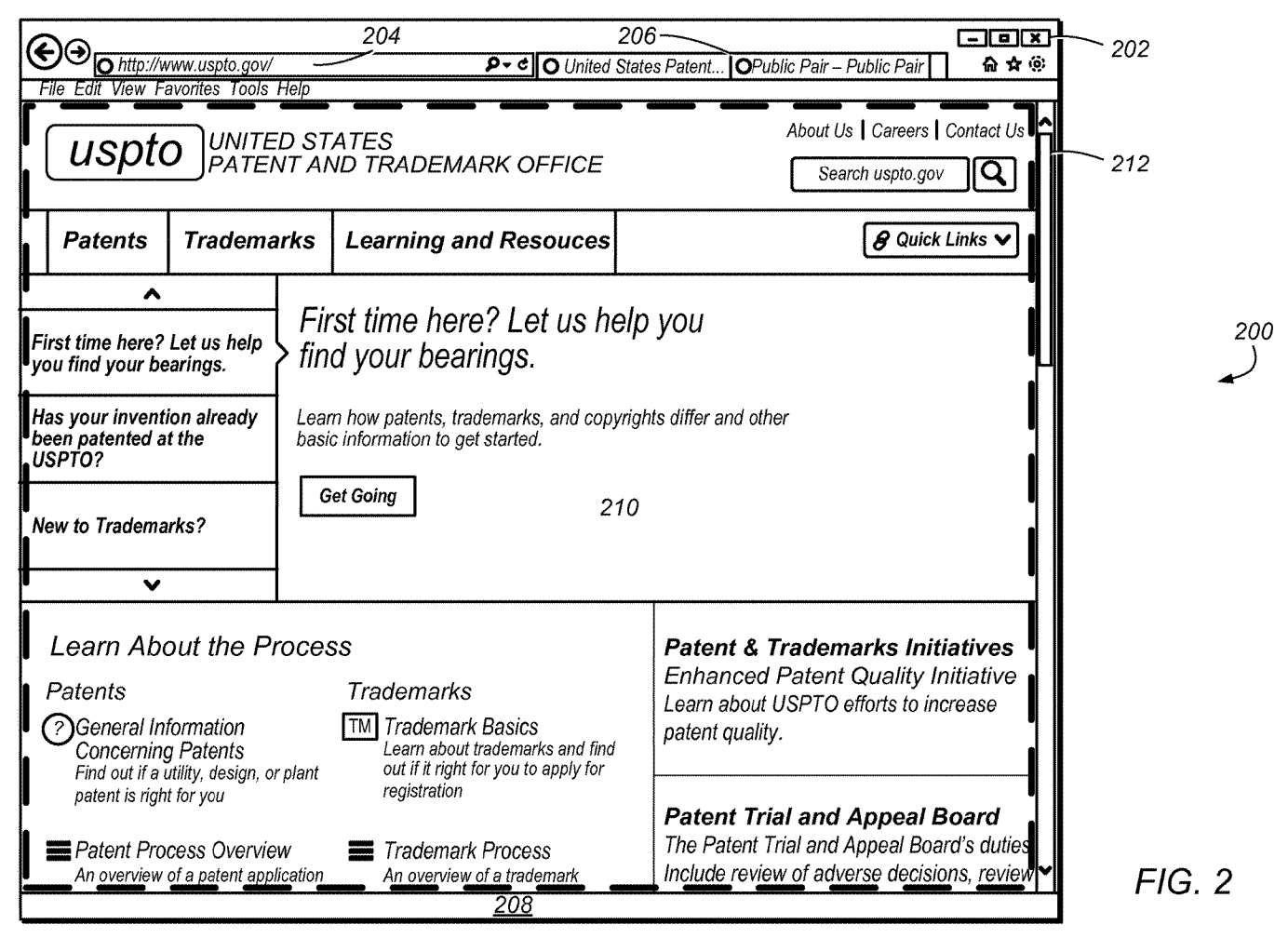

Turning now to FIG. 2, an example of the graphical output of an embodiment of content display program 200 (which may be run on a client computing system) is shown. In this example, content display program 200 is a web browser (specifically, Microsoft® Internet Explorer®). As shown, the content that is currently displayed by content display program 200 is the home page of the United States Patent and Trademark Office. Content display program 200 may display any of various user interface elements. As shown, content display program 200 includes window functions 202, address bar 204, tabs 206, status bar 208, and scroll bar 212. The currently visible portion of the USPTO home page is displayed within viewport 210.

Window functions 202 are configured to minimize, maximize, and close content display program 200; address bar 204 is configured to accept an address from which content may be loaded; tabs 206 are configured to indicate different content pages that are currently open; status bar 208 is configured to show the current status of content display program 200; viewport 210 is configured to display content; and scroll bar 212 is configured to allow a user to scroll viewport 210 to change which portion of the content is displayed therein.

As used in this disclosure, the term "viewport" refers to a portion of a user interface of a content display program that displays the currently visible portion of the electronic content. (In some instances, the viewport may display the entirety of the electronic content, rather than just a portion thereof) In the embodiment of FIG. 2, the example viewport shown is that section of the user interface of content display program 200 which contains the visible portion of the USPTO home page. A viewport may in some instances be a section of (or the entirety of) the user interface of a content display program, or it may be a user interface provided by an operating system of a client computing system. The user interface of content display program 200 may in some instances include other visible elements besides the viewport, such as scroll bars, control menus, etc.; in other instances, it may be the case that the viewport takes up the entire user interface of content display program 200.

A content provider may find it desirable, for a variety of reasons, to be able to determine those portions of downloaded content (referred to as "elements of content") that are actually viewed by users. It may also be desirable to determine when such portions were visible in the viewport, for how long they were visible in the viewport, and/or where in the viewport they were visible. This data may be indicative of a level of user engagement with (e.g., a likelihood that the user has read) the content. For example, elements of content that were only in the viewport very briefly (e.g., 1 second or less) may be considered less likely to have been read, and elements of content that were in the viewport for a longer period of time (e.g., 5 seconds or more) may be considered more likely to have been read. More detail regarding the likelihood of engagement is provided below.

According to some embodiments of this disclosure, it may be desirable to include executable code with the electronic content that is transmitted to a client computing system. Such executable code may be embedded within the electronic content, or it may be provided separately. For example, in the context of web content, it may be convenient for such executable code to be JavaScript® code that may be run by a web browser on the client computing system. One of ordinary skill in the art with the benefit of this disclosure will understand that various other options for transmitting such executable code are available, whether in the context of web content or in other contexts.

The executable code transmitted to the client computing system may be capable of monitoring the viewport. For example, in the web context, the executable code may run within the user's web browser to monitor the viewport of the web browser. In other contexts, such monitoring may be accomplished in other suitable manners. For example, if the viewport is part of an application configured to display application-specific content, then the executable code may be provided in any way that is supported by that application, or by the operating system of the client computing system. For example, if the application does not include any facilities for monitoring the viewport, monitoring may be accomplished by causing the operating system to create screenshots at selected times. These screenshots may then be analyzed to determine which elements of content were visible in the viewport.

Various types of monitoring may be accomplished by the executable code. For example, the executable code may scan the viewport at selected times to determine what content is viewable within the viewport. In some cases, this scanning may be done periodically. In other cases, the scanning may be done every time the viewport changes—for example, every time the user scrolls or interacts with the electronic content in a way that changes what is viewable in the viewport. For example, it may be possible to detect programmatically via JavaScript® code that a user has actuated a scroll bar or otherwise changed what is viewable in the viewport. It should be noted that other interactions besides scrolling (for example, changing a zoom level, resizing the content display program, etc.) may sometimes change what is viewable in the viewport.

In various embodiments, the monitoring performed by the executable code may have any desired level of granularity with regard to the elements of content within the viewport. For example, the monitoring may track individual words, sentences, paragraphs, images, containers (e.g., containers with selected IDs), selected HTML elements, etc. within the viewport. Tracking user engagement at these levels of granularity may provide additional information about what portions of the electronic content the user has engaged with.

In order to track which elements of content are within the viewport, various methods may be used. In one embodiment, the position and dimensions of elements on a page of content may be calculated, and the position and dimensions of the viewport may also be calculated (e.g., via JavaScript®). For example, the positions and dimensions of all of the elements on the page may be calculated when the page is first loaded, and the position and dimensions of the viewport may be calculated every time the viewport changes (e.g., via a user scrolling or otherwise).

In another embodiment, specific attributes (e.g., the IDs of the elements which contain selected content) may be set, and then the positions and dimensions of only the elements with those attributes may be calculated. For example, all text nodes within any selected elements that are within the view port may be determined (e.g., by iterating all the children of such elements, and checking if the node is of the text type). The content may also in some cases be annotated with attributes so that selected items of content may be extracted by selecting all elements that have those attributes.

The executable code transmitted to the client computing system may also be executable to determine where, within the viewport, various elements of the content are displayed. Research has been conducted (e.g., with eye-tracking hardware) to attempt to determine which portions of a web page are the most likely to receive attention from a user. For example, in some cases, content on the left side of the viewport is more likely to be engaged with than content on the right side, and content at the top of the viewport is more likely to be engaged with than content at the bottom.

One example of an eye-tracking study is described at www.nngroup.com/articles/f-shaped-pattern-reading-web-content. The results of this study indicate that users tend first to scan horizontally near the top of the viewport, then scan horizontally somewhere farther down the viewport, and then finally scan vertically down the left-hand side of the viewport. Based on knowledge of such eye-tracking data or other data regarding user habits, it may thus be desirable for a content provider to know where the various items of content reside within the viewport while a user views electronic content. That is, data regarding user engagement with individual items of content within the electronic content may be inferred based on the data collected by the executable code indicating where within the viewport such items were displayed, combined with data regarding typical user habits.

Figure 3:
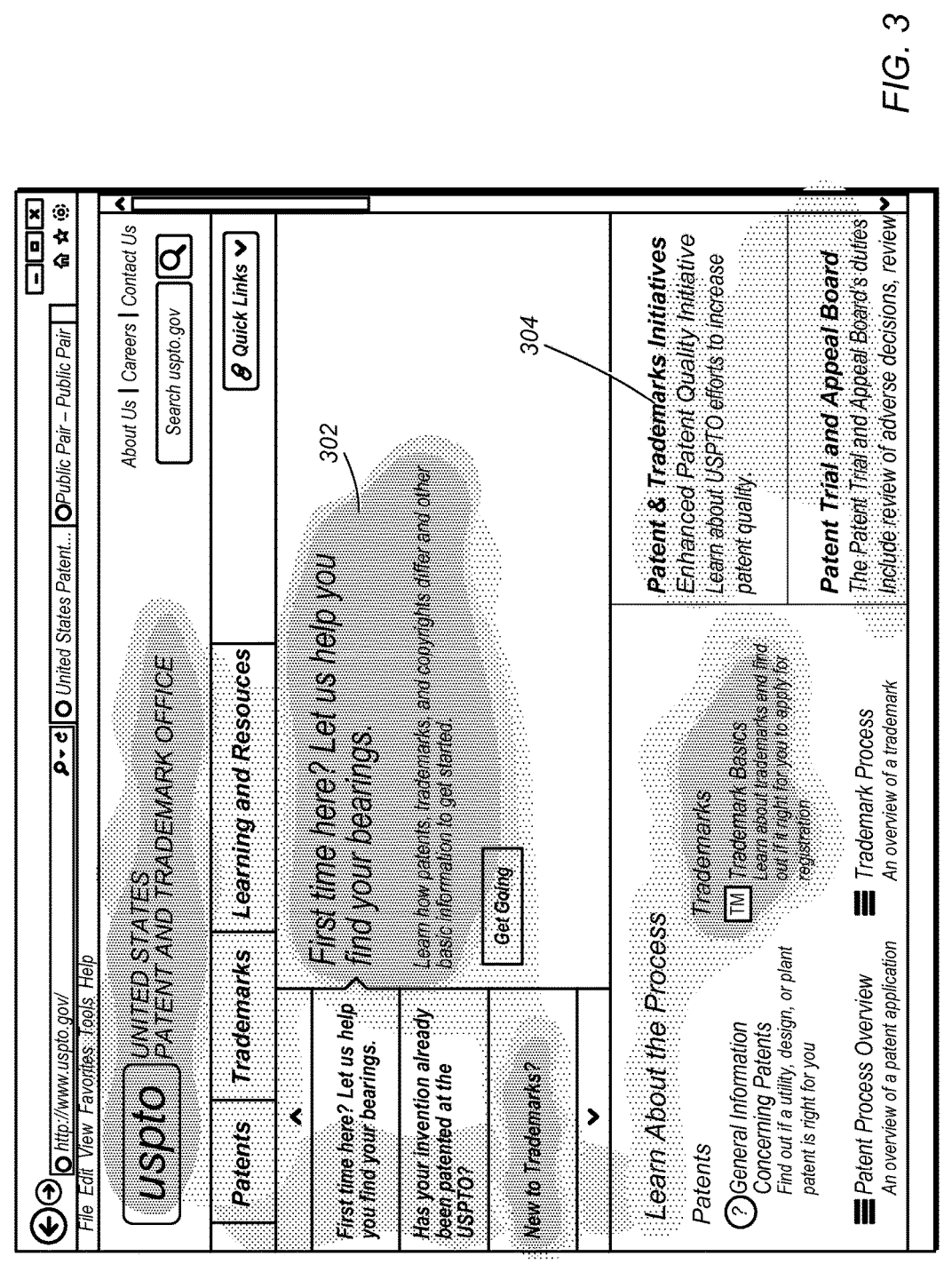

Turning now to FIG. 3, an example of an estimate of user engagement with the viewport of FIG. 2 is shown. In this illustration, a heat map is used to signify which portions of the content are more likely to be read by the user—as shown, the darker regions are indicative of more likely user engagement, and the lighter regions are indicative of less likely user engagement. For example, as shown, element 302 is more likely to have been read by the user than element 304.

In one embodiment, data such as that shown in FIG. 3 may be calculated each time the executable code on the client computing system captures data, for whatever content is viewable in the viewport at that moment. For example, every time the user scrolls a web page, the elements of content (and their positions) within the viewport may typically change. In one embodiment, a "snapshot" of the viewport—e.g., data indicating what was present within the viewport and where—may be generated and stored. In other embodiments, only simpler data regarding the locations of elements within the viewport and the time durations at such locations may be stored. In such cases, additional processing may be performed later (either at the client computing system or at the server computing system).

In general, the executable code transmitted to the client computing system may determine, with any desired granularity, which individual elements of the electronic content were displayed within the viewport, where within the viewport such individual elements of content were displayed, when such individual elements of content were displayed at such locations, how long such individual elements of content were displayed, how such individual elements of content were moved by user interactions, and any other relevant data that may be indicative of user engagement with the electronic content.

The data collected by the executable code on the client computing system may in some cases be analyzed (either wholly or partially) by the client computing system before transmission back to the server. In other cases, the data may be transmitted to the server without being analyzed at the client computing system. In some cases, the data may be immediately transmitted back to the server. In other cases, the data may be stored temporarily at the client computing system, and then later transmitted to the server in an aggregated or batched form. The server to which the data is transmitted may be the same content server from which the content originated, or some other server (e.g., a database server).

In one example, data may be aggregated on the client computing system prior to transmission in order to reduce network traffic. Then periodically (e.g., with a period of 10 seconds, or 1 minute, or any other desired period), the data may be transmitted to the content server in batches. The content server may store the received data at a database server for later analysis; alternatively, the content server may perform some analysis of the data first, and then store the results of such analysis at a database server. The database server may be connected to the content server via a network such as network 112 shown in FIG. 1, or the servers may be connected by an internal or other network. In some cases, one or both of such servers may be virtualized servers running on the same or different physical hardware.

In one embodiment, the data may be stored on the database server according to a database schema that includes various details about the user from which the data was collected and the content to which it relates. For example, the schema may include elements such as "organization_id" (to keep track of an organization with which the user is associated), "community_id" (to keep track of a community with which the user is associated), "user_id" (to keep track of the identity of the user), "content" (e.g., the element of content itself, or an ID of a container that contains the element of content), and "score" (a representation, discussed more fully below, of how likely the user is to have read or engaged with this particular element of content).

The score for each element of content may be determined to indicate a likelihood that that element of content has been read by the user. Various types of scoring methods are contemplated within the scope of this disclosure. One possible scoring method may proceed as follows.

When the user has not read or engaged with a particular element of content (e.g., when the element has not ever been viewable within the viewport), the score for that element is 0. This may be represented either by an entry of 0 for the score field in the database table, or simply by the absence of any entry for that user_id and content pair.

When a user alters the viewport, for example via a scrolling operation, the following may take place for each element of content. For each element in the viewport, the new location and the time at which the element moved to that new location (e.g., from outside the viewport or from some other location within the viewport) may be stored. For example, this data may be stored in a client-side variable. When the element moves away from that location, the variable may be updated to reflect how long the element remained at that location. This data may thus be collected for each location that an element of content occupies in the viewport.

In one embodiment, a score based on the above data may be calculated as follows:

$$s = K(dt) * P(x,y)$$

where s is the score contribution from a given location and time duration within the viewport; (x,y) is the location within the viewport; dt is the time duration that the element of content remained at location (x,y); P is a function describing the estimated percentage of viewing time at location (x,y) (for example, based on heat map data or user studies, as described above with reference to FIG. 3); and K is a function relating the amount of time spent with the content in the viewport to the likelihood that the user actually read the content. For example, K may in some cases be defined to grow (e.g., linearly) for small values of dt, then flatten out as a duration is reached that would allow the user to have had sufficient time to engage with all of the content in the viewport. In some instances, K may also be defined to decrease toward (or all the way to) zero for even larger values of dt, such that when a user switches applications, leaves the screen, or is otherwise no longer paying attention to the element of content, then the element of content receives a low score because it may not have been engaged with.

One of ordinary skill in the art will recognize that some flexibility has been designed into the definitions of K and P. These functions may be refined as needed, according to the individual use case, as well as based on feedback about the accuracy of the calculated scores. For example, in some instances the calculation may also include (e.g., via the P function) some data about the style of the various elements of content within the viewport. For example, the size of text relative to other elements in the viewport may be calculated, and this may impact the probability that the user has engaged with that text. For example, the height in pixels of the text when the page is displayed may be determined, and it may be inferred that larger text was most likely to be seen. If an image is in the viewport, assumptions could be made about images being more likely to be looked at than text. Various other refinements and options will also be apparent to one of ordinary skill in the art with the benefit of this disclosure.

Finally, as noted above, s is defined as the score contribution from an element of content being at one given location (x,y) for a given time duration dt. The total score S would thus be the sum of all such contributions for the element of content, wherein the sum is calculated over all locations within the viewport that the element occupied:

$$S = \sum_{(x,y)} s$$

As noted above, the foregoing is merely one example of a way of determining a score for an element of content. Various details may be changed without departing from the scope of this disclosure. One of ordinary skill in the art will understand that with suitable definitions, the score for an element could be normalized to correspond directly to the probability that the user has engaged with that element. For example, an element with a determined likelihood of 50% engagement would have a score of 0.5. In other embodiments, however, the scores need not be normalized. In such un-normalized cases, a relatively higher score would simply indicate that the element of content was more likely to have been engaged with than some other element with a relatively lower score, but it would not directly correspond to a probability.

Figure 4:
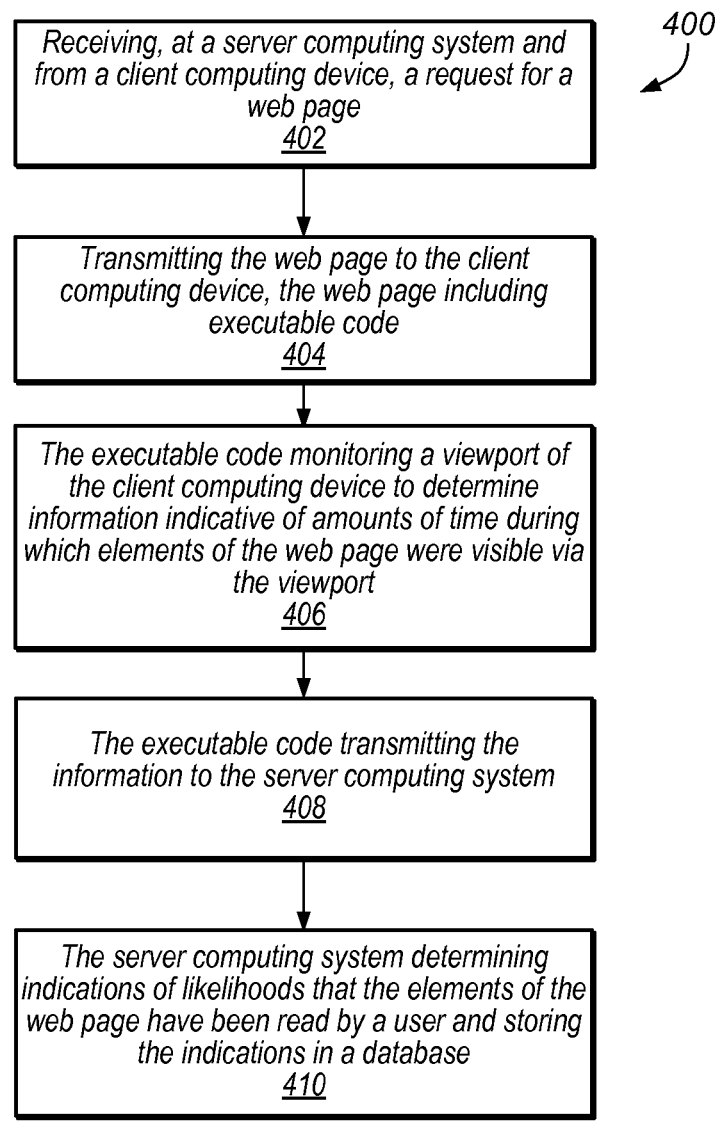
FIG. 4 is a process flow according to one embodiment.

Turning now to FIG. 4, process flow 400 for user engagement tracking according to one embodiment is shown. Flow begins at step 402.

At step 402, a server computing system receives a request from a client computing system for a web page. As noted above, various other types of content servers and corresponding other types of electronic content are also contemplated within this disclosure; in the present example, however, the received request is for a web page. This request may be received in any suitable manner, such as via the Internet, via an intranet, or via any other type of network. Flow proceeds to step 404.

At step 404, the server computing system transmits the requested web page to the client computing system; further, the transmitted web page includes executable code. The executable code may have been explicitly requested by the client, or it may not have been explicitly requested in some embodiments. The executable code may be embedded within the web page, or it may be transmitted separately in some cases. The executable code may be executable via a content display program (a web browser in this example) or it may in some cases be directly executable, e.g. via the operating system of the client computing system. Flow proceeds to step 406.

At step 406, the executable code is executed by the client computing system to monitor a viewport of the client computing system. The executable code determines information that indicates the amounts of time during which various elements of the web page were visible via the viewport. For example, the executable code may simply determine durations during which the elements were visible in the viewport. In another embodiment, the executable code may determine respective start times at which elements became visible, and stop times at which elements became non-visible, for each element. In some instances, additional information may also be gathered, such as the locations within the viewport that each element occupied and/or how various user interactions may have moved the elements into, within, and out from the viewport. Flow proceeds to step 408.

At step 408, the executable code transmits the determined information to the server computing system. This transmitted information may in some embodiments be partially or wholly processed by the client computing system prior to transmission back to the server computing system, or it may be simply the raw data from the monitoring of the viewport. In some cases, the data may be aggregated and periodically transmitted back to the server computing system, and in other cases it may be transmitted back in un-aggregated form as soon as it is available for transmission. Flow proceeds to step 410.

At step 410, the server computing system determines indications of likelihoods that the various elements of the web page have been read by a user, and stores these indications in a database. The indications of likelihoods may correspond to the scores discussed above, or they may be calculated in any other suitable way. The indications of likelihoods may be normalized as probabilities (i.e., with a score of 0.5 corresponding to a 50% likelihood of the user having read the element, etc.), or they may be un-normalized scores. The indications of likelihoods may be determined by the server computing system based on raw data transmitted by the client computing system (e.g., raw data such as the dt and (x,y) variables discussed above), or they may be based on data that has already been partially or wholly processed by the client computing system. For example, in the case of data that has been wholly processed by the client computing system, the information received from the client computing system may correspond to the actual scores for each element of content. In the case of data that has been partially processed by the client computing system, the information received from the client computing system may correspond to some intermediate representation. Flow ends at step 410.

Figure 5:
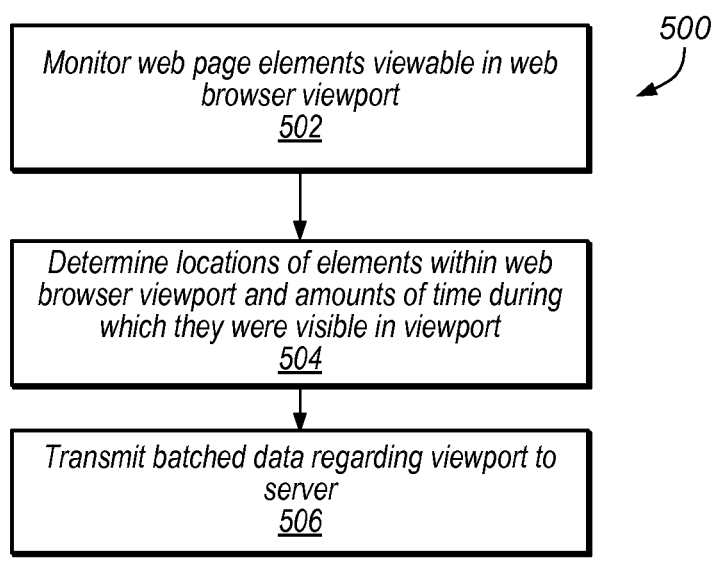
FIG. 5 is a process flow according to another embodiment.

Turning now to FIG. 5, process flow 500, which may be executed at the client computing system by the executable code, is shown. This example is also described in terms of web pages for the sake of concreteness, but again, one of ordinary skill in the art with the benefit of this disclosure will understand that various other fields and types of content are also contemplated. Flow begins at step 502.

At step 502, the executable code monitors web page elements that are viewable in a viewport of a web browser executing on the client computing system. For example, the executable code may be JavaScript® code that is executable by the web browser (e.g., in a virtual machine). In other cases, other types of executable code may be used for this purpose. In general, any suitable language may be used, whether executed directly or indirectly, and whether or not it runs within the environment of the web browser. For example, the executable code may be provided to the client computing system in the form of an entirely separate executable program. Such a separate executable program may be configured to interface with the web browser, or it may be configured to take screen shots of what is visible to a user of the client computing system, or it may be configured to collect data in any other suitable manner. Flow proceeds to step 504.

At step 504, the executable code determines locations of elements of the web page within the web browser viewport and amounts of time during which such elements were visible within the viewport. For example, as noted above, the executable code may simply determine durations during which the elements were visible in the viewport; or it may determine respective start times and stop times for each element. In some instances, additional information may also be gathered, such as how various user interactions may have moved the elements. Flow proceeds to step 506.

At step 506, the executable code aggregates the data regarding the locations of the elements of the web page into an aggregated form for more efficient transmission back to the server. This aggregated form may be compressed or uncompressed, and it may be transmitted back to the server whenever it is convenient to do so. For example, the aggregated data may be transmitted back periodically. In some embodiments, the executable code may be configured to determine a level of network traffic and transmit the data back to the server computing system when network traffic is below a selected threshold. For example, the level of network traffic may be determined by interfacing with an operating system of the client computing system. In another embodiment the level of network traffic may be estimated by determining how much network bandwidth the web browser is currently using. Flow ends at step 506.

Once the levels of user engagement with various elements of content have been determined, that data may be put to advantageous use in various ways. For example, in some embodiments, the data may be used to recommend content of interest to the user. That is, since information has been gained about what elements of content the user found interesting enough to engage with, that information may be used to recommend similar content to the user. Various ways of selecting similar content to recommend may be employed, such as collaborative filtering, etc. In this embodiment, the similar content may typically be content that regards the same topic as the content that the user engaged with. The recommended content may be advertising-based, or non-advertising-based content. As one advertising-based example, a user who engages with content regarding flights to Baltimore might also be interested in content regarding hotels or rental cars in Baltimore, and so advertisements for such things might be displayed. As one non-advertising-based example, a user who engages with content regarding vegetarian recipes might also be interested in other vegetarian recipes. Various other types of content, such as videos, images, PowerPoint presentations, other types of files or media, etc. may also be recommended.

In a related embodiment, topics of interest (as opposed to related content) may be recommended for the user. This technique may include recommending topics that tend to have some correlation (in terms of user engagement) with the topic that is represented by the content that the user has engaged with. For example, a user who engages with content regarding luxury yachts may also be interested in luxury homes. Luxury homes are a separate topic from luxury yachts, but those two topics may have some correlation. As above, such recommendations may be advertising-based, or non-advertising-based.

In another embodiment, similarities between users may be determined. For example, users that are known to engage with similar or the same content may have various things in common. This information may be put to use by, for example, recommending that the users form a relationship on an information sharing service. For example, the recommendation may in some instances be for the users to follow one another on Twitter®. In general, an information sharing service is a computer system that stores or accesses information about users, permits those users to establish relationships with one another via the system, and stores information indicative of the established relationships. Facebook®, Twitter®, LinkedIn®, and Google+® are some examples of information sharing services. The notion of a "relationship" that is made within the context of an information sharing service connotes that the parties to the relationship are users of the information sharing service (e.g., the users have accounts with the information sharing service), and that, for each link in the relationship path, the parties in that link have consented to the relationship via the service in some way. Accordingly, a relationship within the context of an information sharing service is not met merely by a computer system storing information designating some connection between entities without the entities both being users of the computer system, and without actually permitting the users to establish the relationship.

In other embodiments, other types of content may also be recommended to the user. For example, discussion or collaboration groups that the user might want to join may be recommended. In cases where it is determined that the user is having some sort of problem or issue, a knowledge service or information database with troubleshooting information might be recommended.

In yet another embodiment, data may be aggregated across many users. According to this embodiment, the most popular content across a whole organization or community may be determined and promoted. The popularity determination may in some cases be made across all users, or it may be made across only some subset of users (e.g., a certain type of user, or users having similar demographic information, or users having similar interests).

Figure 6:
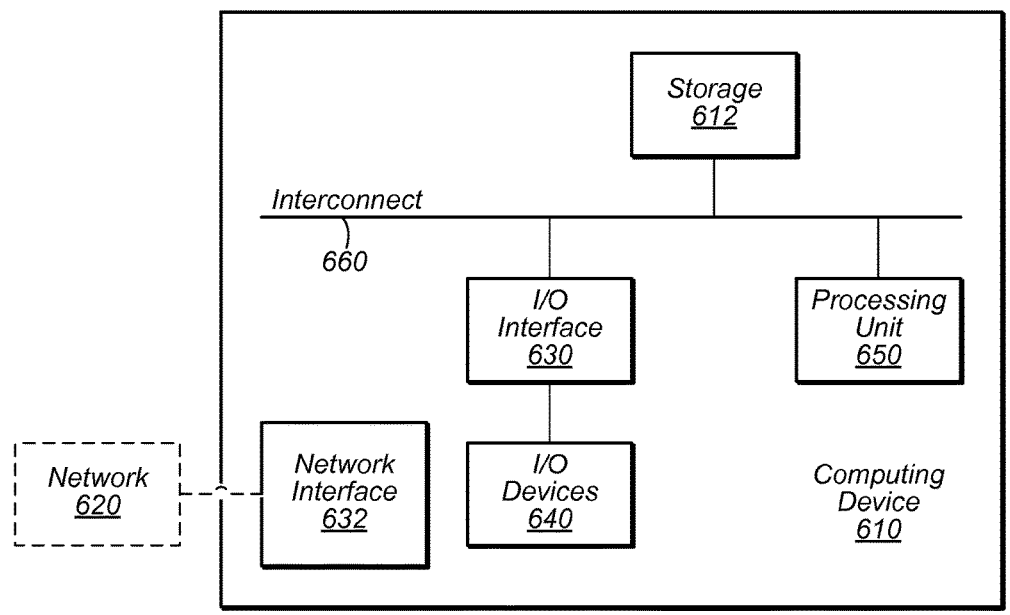
FIG. 6 is a block diagram illustrating a computing system, according to one embodiment.

Turning now to FIG. 6, a block diagram of a computing device (which may also be referred to as a computing system) 610 is depicted, according to some embodiments. Computing device 610 may be used to implement various portions of this disclosure. Computing device 610 is one example of a device that may be used as a mobile device, a server computing system, or any other computing system implementing portions of this disclosure.

Computing device 610 may be any suitable type of device, including, but not limited to, a personal computer system, desktop computer, laptop or notebook computer, mobile phone, mainframe computer system, web server, workstation, or network computer. As shown, computing device 610 includes processing unit 650, storage subsystem 612, input/output (I/O) interface 630 coupled via interconnect 660 (e.g., a system bus). I/O interface 630 may be coupled to one or more I/O devices 640. Computing device 610 further includes network interface 632, which may be coupled to network 620 for communications with, for example, other computing devices.

As described above, processing unit 650 includes one or more processors. In some embodiments, processing unit 650 includes one or more coprocessor units. In some embodiments, multiple instances of processing unit 650 may be coupled to interconnect 660. Processing unit 650 (or each processor within processing unit 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory in some embodiments. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In some embodiments, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"Based On." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but it does not foreclose the determination of A from also being based on C. In other instances, A may be determined based solely on B.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure (even where only a single embodiment is described with respect to a particular feature). Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although some example embodiments are described as providing various advantages, any particular embodiment according to this disclosure may provide some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, at a server computing system from a client computing system, a request for a page of electronic content including elements of content;
in response to the request, the server computing system transmitting the page to the client computing system, wherein the transmitted page includes executable code capable of causing operations comprising:
causing a plurality of elements of content of the page of electronic content to be visible in a viewport of the client computing device;
in response to a scroll command from a user,
determining locations at which respective elements of content were visible on a display of the client computing system prior to the scroll command; and
determining durations of time during which the respective elements of content were visible at the determined locations on the display of the client computing system prior to the scroll command; and
transmitting viewer interaction information indicative of the locations and durations of time to the server computing system; and
storing, by the server computing system, respective engagement scores for the respective elements of the page, wherein the respective engagement score for a given element of content is determined by:
calculating a first engagement sub-score for the given element of content for a first duration that the element of content remained at a first location within the viewport, wherein the first engagement sub-score is calculated based on the result of a first function using the first location and a second function using the first duration;
calculating a second engagement sub-score for the given element of content for a second duration that the element of content remained at a second, different location within the viewport, wherein the second engagement sub-score is calculated based on the result of the first function using the second location and the second function using the second duration; and
calculating a sum using the first engagement sub-score and the second engagement sub-score, wherein the respective engagement score for the given element of content is based on the sum;
wherein the first function relates a particular location within the viewport to an estimation of user engagement with elements of content at the particular location within the viewport, and the second function relates the duration that the element of content remained at the particular location to a model of user engagement.

2. The method of claim 1, further comprising:
determining, based on the respective engagement scores for the respective elements of the page, at least one topic having a likelihood of being of interest to the user.

3. The method of claim 2, further comprising:
transmitting a recommendation for the at least one topic to the client computing system.

4. The method of claim 1, further comprising:
determining, based on the respective engagement scores for the respective elements of the page, a second user with a determined similarity to the user.

5. The method of claim 4, wherein the operations further comprise:
transmitting, to the user of the client computing system, a recommendation to associate with the second user.

6. The method of claim 1, wherein the executable code is further capable of causing the client computing system to determine the respective engagement scores for respective elements of the page.

7. The method of claim 1, wherein the executable code is further capable of causing the client computing system to transmit the viewer interaction information to the server computing system at selected times based on a determined level of network congestion.

8. An article of manufacture including a non-transitory, computer-readable medium having instructions stored thereon that are capable of causing a computer system to perform operations comprising:
in response to a request from a client computing system that includes a viewport configured to display content, transmitting content including executable code to the client computing system, wherein the executable code is capable of causing the client computing system to:
cause a plurality of elements of content to be visible in the viewport of the client computing device;
in response to a scroll command from a user, monitor the viewport to:
determine locations within the viewport at which respective elements of content were visible prior to the scroll command; and
determine durations of time during which the respective elements of content were visible at the determined locations via the viewport prior to the scroll command; and
transmit information indicative of the locations and durations of time to the computer system;
determining respective engagement scores for the respective elements of the content, wherein the respective engagement score for a given element of content is determined by:
calculating a first engagement sub-score for the given element of content for a first duration that the element of content remained at a first location within the viewport, wherein the first engagement sub-score is calculated based on the result of a first function using the first location and a second function using the first duration;
calculating a second engagement sub-score for the given element of content for a second duration that the element of content remained at a second, different location within the viewport, wherein the second engagement sub-score is calculated based on the result of the first function using the second location and the second function using the second duration; and
calculating a sum using the first engagement sub-score and the second engagement sub-score, wherein the respective engagement score for the given element of content is based on the sum;
wherein the first function relates a particular location within the viewport to an estimation of user engagement with elements of content at the particular location within the viewport, and the second function relates the duration that the element of content remained at the particular location to a model of user engagement; and storing the respective engagement scores for the respective elements of content in a database.

9. The article of claim 8, wherein a content-browsing program executable on the client computing system includes the viewport.

10. The article of claim 8, wherein the operations further comprise: aggregating the engagement scores for a plurality of different users in the database.

11. The article of claim 10, wherein the operations further comprise: determining, based on the aggregated engagement scores, popularity rankings for various items of electronic content on the computer system.

12. The article of claim 11, wherein the popularity rankings are further based on characteristics of various ones of the plurality of different users.

* * * * *